(12) United States Patent
Bermudez et al.

(10) Patent No.: US 10,604,342 B1
(45) Date of Patent: Mar. 31, 2020

(54) RECONFIGURABLE SORTATION WALL

(71) Applicant: Amazon Technologies, Inc., Seattle, WA (US)

(72) Inventors: Jaemi Cheri Tiangco Bermudez, Des Moines, WA (US); Mangesh Kolharkar, Sammamish, WA (US); Doug Bryan, Seattle, WA (US); Darryl Jensen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/105,362

(22) Filed: Aug. 20, 2018

(51) Int. Cl.
| | | |
|---|---|---|
| B65G 1/04 | (2006.01) | |
| A47B 57/10 | (2006.01) | |
| A47B 57/58 | (2006.01) | |
| A47F 3/00 | (2006.01) | |
| A47F 5/00 | (2006.01) | |
| A47F 5/10 | (2006.01) | |

(52) U.S. Cl.
CPC .............. *B65G 1/04* (2013.01); *A47B 57/10* (2013.01); *A47B 57/586* (2013.01); *A47B 57/588* (2013.01); *A47F 3/004* (2013.01); *A47F 5/005* (2013.01); *A47F 5/105* (2013.01)

(58) Field of Classification Search
CPC ... B65G 1/04; B65G 1/10; B65G 1/02; B65G 1/023; A47B 45/00; A47B 57/10; A47B 57/58; A47B 57/583; A47B 57/585; A47B 57/586; A47B 57/588; A47B 5/105; A47F 3/004; A47F 5/005
USPC ........................................ 198/836.1, 836.4
See application file for complete search history.

(56) References Cited

U.S. PATENT DOCUMENTS

| | | | | |
|---|---|---|---|---|
| 1,375,855 | A * | 4/1921 | O'Connor | A47B 57/58 108/60 |
| 2,516,122 | A * | 7/1950 | Hughes | A47B 57/583 211/184 |
| 4,428,304 | A * | 1/1984 | Moser | A47B 45/00 108/133 |
| 5,115,920 | A * | 5/1992 | Tipton | B65G 1/023 211/151 |
| 5,259,518 | A * | 11/1993 | Sorenson | B65G 1/023 211/151 |
| 6,116,436 | A * | 9/2000 | Ferrucci | A47B 55/02 108/181 |
| 6,705,477 | B1 * | 3/2004 | Narkis | A47B 57/588 211/153 |

(Continued)

*Primary Examiner* — Mark A Deuble
(74) *Attorney, Agent, or Firm* — BakerHostetler

(57) ABSTRACT

A wall includes first and second shelves defining a space therebetween and each have bottom and top surfaces, the top being planar and smooth between induction and outlet sides. A track assembly on the bottom of the first shelf defines guides parallel with the induction and outlet sides and defining sequential slots. A partition has top and bottom portions telescopically coupled for relative vertical translation between a first position, where pins of the bottom portion anchor within receptacles of the second shelf, and a second position, in which the pins are remote from the receptacles. Rollers coupled to the top portion roll along the guides to translate the partition therealong. Locking members opposite the rollers each slide along a latch structure between a locked position in which a locking pin resides within one of the slots and an unlocked position in which the locking pin is remote from each slot.

20 Claims, 10 Drawing Sheets

(56) References Cited

U.S. PATENT DOCUMENTS

| | | | | |
|---|---|---|---|---|
| 6,978,906 | B2* | 12/2005 | Wishart | A47B 47/027 |
| | | | | 211/175 |
| 9,173,489 | B2* | 11/2015 | Sukman | A47B 96/04 |
| 9,700,156 | B1* | 7/2017 | Hance | A47B 57/583 |
| 2005/0139560 | A1* | 6/2005 | Whiteside | A47B 57/586 |
| | | | | 211/119.003 |
| 2008/0145197 | A1* | 6/2008 | Taylor | B65G 1/023 |
| | | | | 414/276 |
| 2011/0174750 | A1* | 7/2011 | Poulokefalos | A47F 1/126 |
| | | | | 211/59.3 |
| 2011/0309043 | A1* | 12/2011 | Kaiser | A47F 5/005 |
| | | | | 211/59.2 |
| 2013/0075352 | A1* | 3/2013 | Mitten | A47F 5/005 |
| | | | | 211/59.2 |
| 2016/0073776 | A1* | 3/2016 | Zeidner | A47B 57/588 |
| | | | | 211/134 |
| 2016/0220038 | A1* | 8/2016 | Simpson | B65G 1/08 |
| 2018/0153313 | A1* | 6/2018 | Padvoiskis | A47B 57/586 |
| 2018/0168346 | A1* | 6/2018 | King | A47B 96/04 |

* cited by examiner

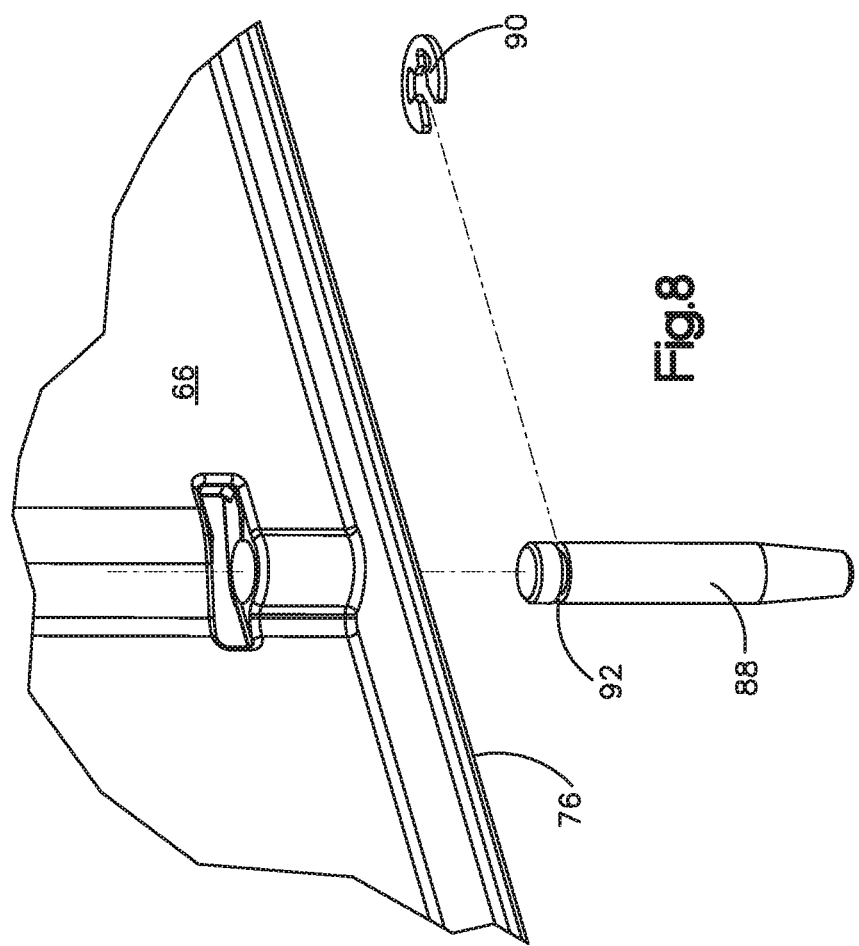
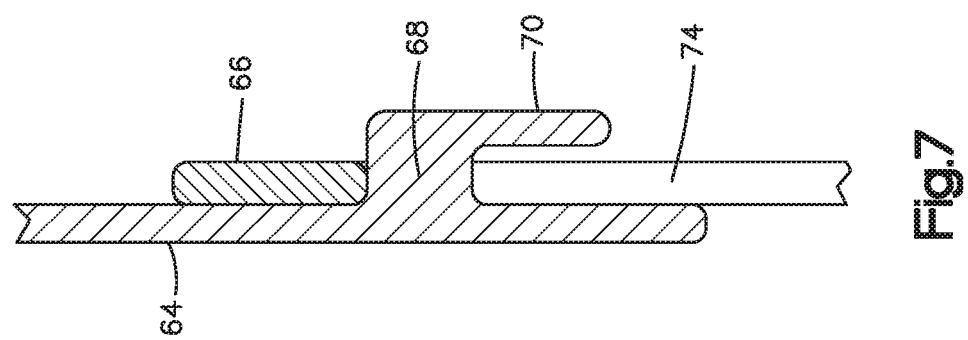

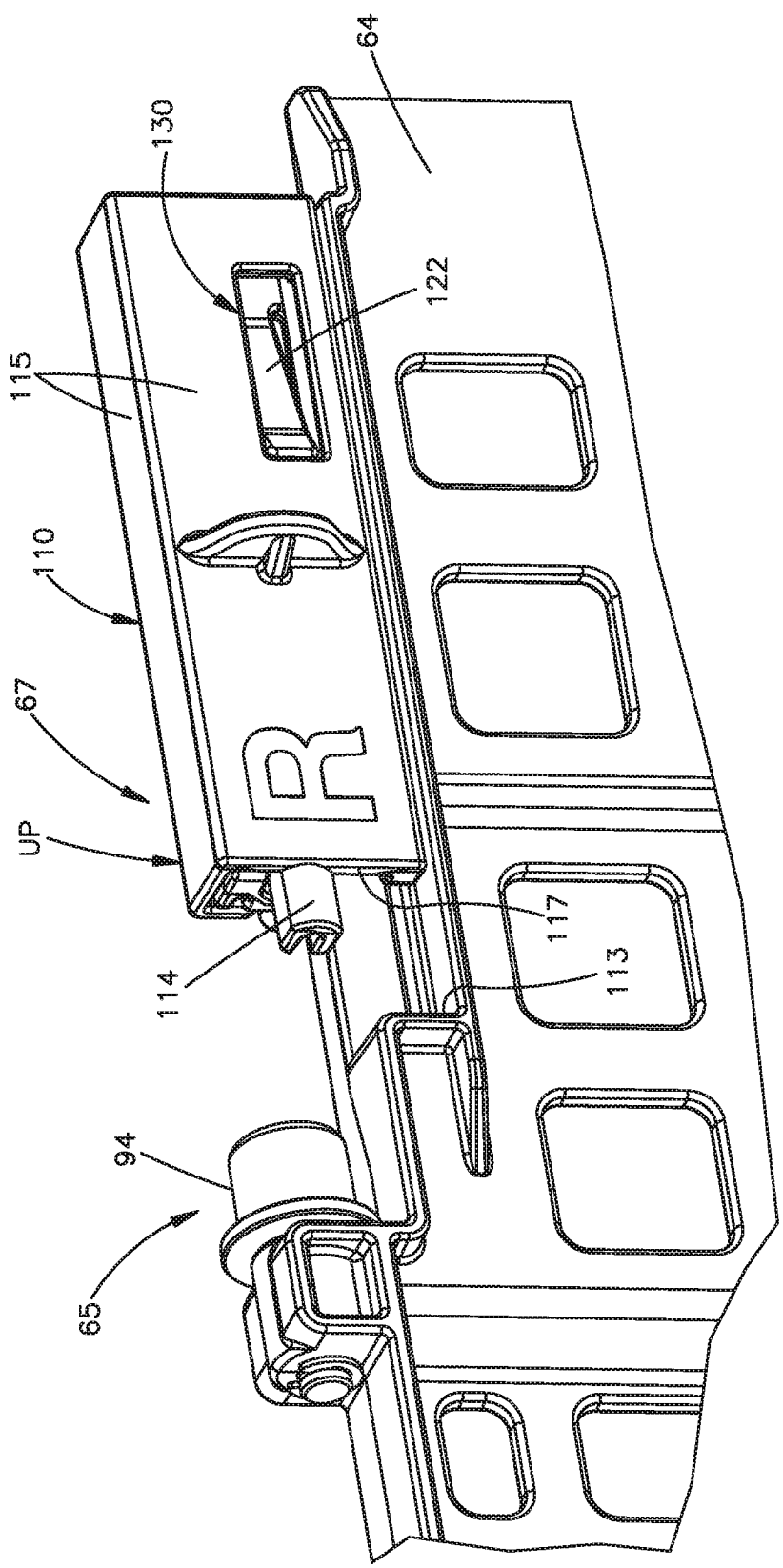

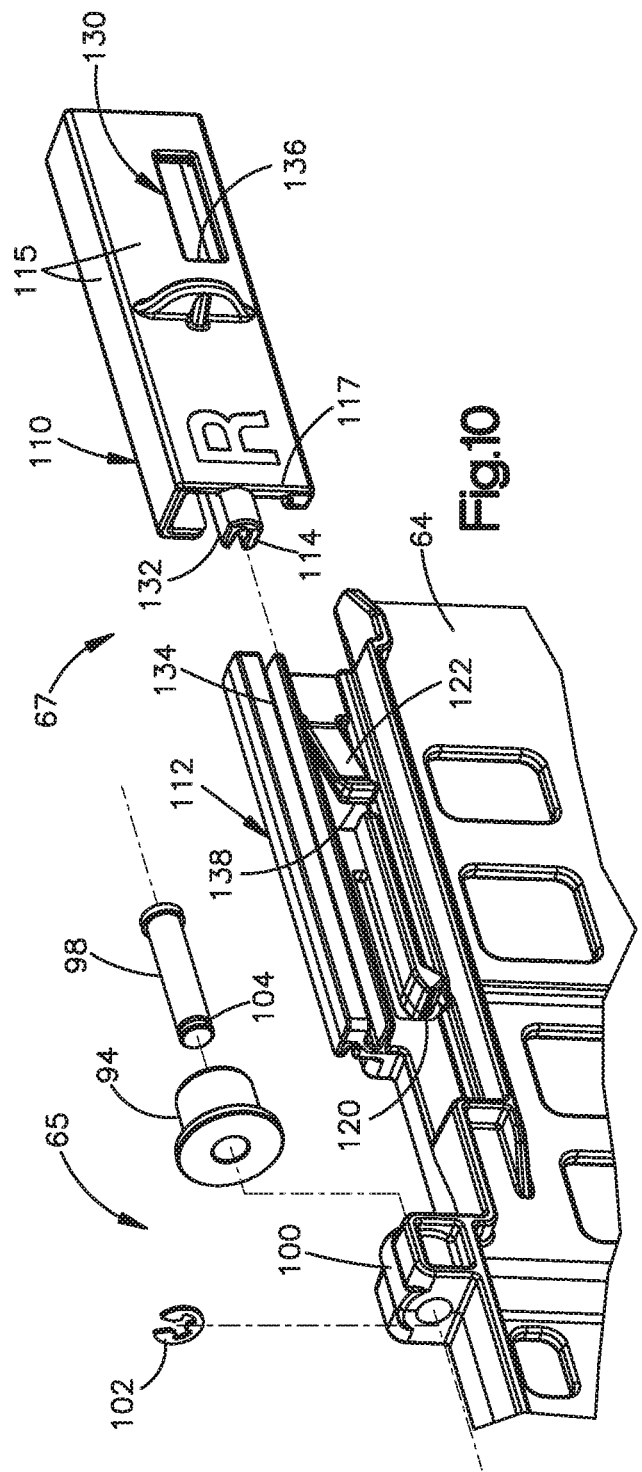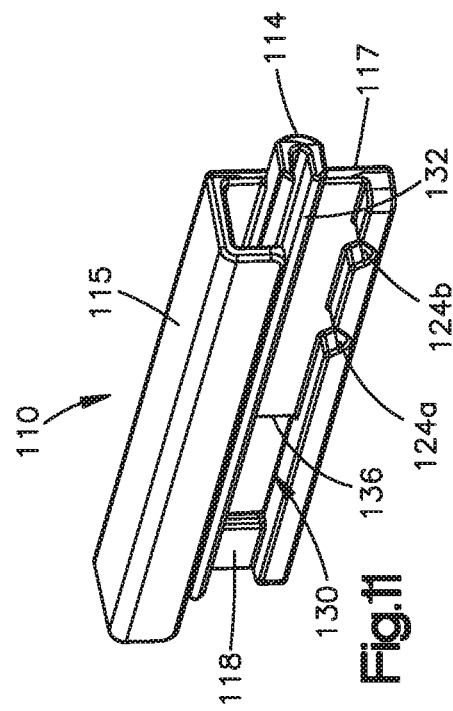

ced to US 10,604,342 B1

RECONFIGURABLE SORTATION WALL

BACKGROUND

In a materials handling facility, such as an order fulfillment center, multiple customer orders are received, where each order specifies one or more items from inventory to be shipped to the customer that submitted the order. To fulfill the customer orders, the one or more items specified in each order may be retrieved, or picked, from inventory (which may also be referred to as stock storage) in the materials handling facility. Under direction of a control system, picked items may be singulated and then inducted into a conveyance mechanism that routes the items to particular destinations, such as sorting stations, in accordance with the customer orders currently being processed. One or more of the sorting stations can be designated for processing customer orders, or even subsets of customer orders, that include multiple items which have been designated by the control system to be grouped and packaged together in a single package. Such groups of items are often referred to in the industry as "multis."

A sorting station for consolidating items into such groups or multis can include a sortation structure, such as type of sortation wall referred to as a "rebin" wall, which has a plurality of receptacles (also referred to herein as or "compartments" or "chutes") in which the singulated items are grouped together, such as at a designated "rebin" portion of the chute located at an induction side of the wall. Once the multi has been fully consolidated in the rebin portion of the chute, the items thereof can be directed, such as by an associate manually pushing the items, across a boundary and into a designated "packing" portion of the chute adjacent an outlet side of the wall. From the packing portion of the chutes, the items can be collected and directed to an order processing station, such as a packing station at which the multis are processed, packed, and labeled for shipping to the customer. A picked, packed and shipped order, such as a multi, does not necessarily include all of the items ordered by the customer, as an outgoing shipment to a customer may include only a subset of the ordered items available to ship at one time from the materials handling facility.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 7 shows a cross-sectional view of complimentary vertical guides of the chute partition, taken along section line 7-7 in FIG. 6;

FIG. 8 shows a perspective view of an anchoring pin of the chute partition illustrated in FIG. 6;

FIG. 9 shows a perspective view of a follower mechanism and a locking mechanism of the of the chute partition illustrated in FIG. 8;

FIG. 10 shows an exploded perspective view of the follower mechanism and the locking mechanism illustrated in FIG. 9;

FIG. 11 shows a perspective view of a locking member of the locking mechanism illustrated in FIG. 10.

DETAILED DESCRIPTION

In fulfillment centers that process large volumes of items that have varying sizes and shapes, rebin walls that include chutes having static, non-adjustable dimensions, or dimensions that are only adjustable with significant maintenance time, are limited in volume of customer orders that can be processed at the wall.

The present disclosure pertains to a rebin wall having chute partitions that are manually adjustable with respect to one or more orthogonal directions, such as a horizontal direction and vertical direction, so as to reconfigure the dimensions of one or more and up to all of the chutes within a typical work stoppage duration, such as a 30 minute lunch break, for example. Thus, rebin walls configured according to the embodiments of the present disclosure can be reconfigured as needed to process orders having different chute volume requirements that would otherwise need to be conveyed to another rebin wall or other sorting station. Moreover, the foregoing wall reconfiguring can occur multiple times per day without significant increases in work stoppage. Thus the rebin walls described herein are expected exhibit a significantly increased sorting efficiency and thus also a significantly increased sorting volume.

Figure 1:
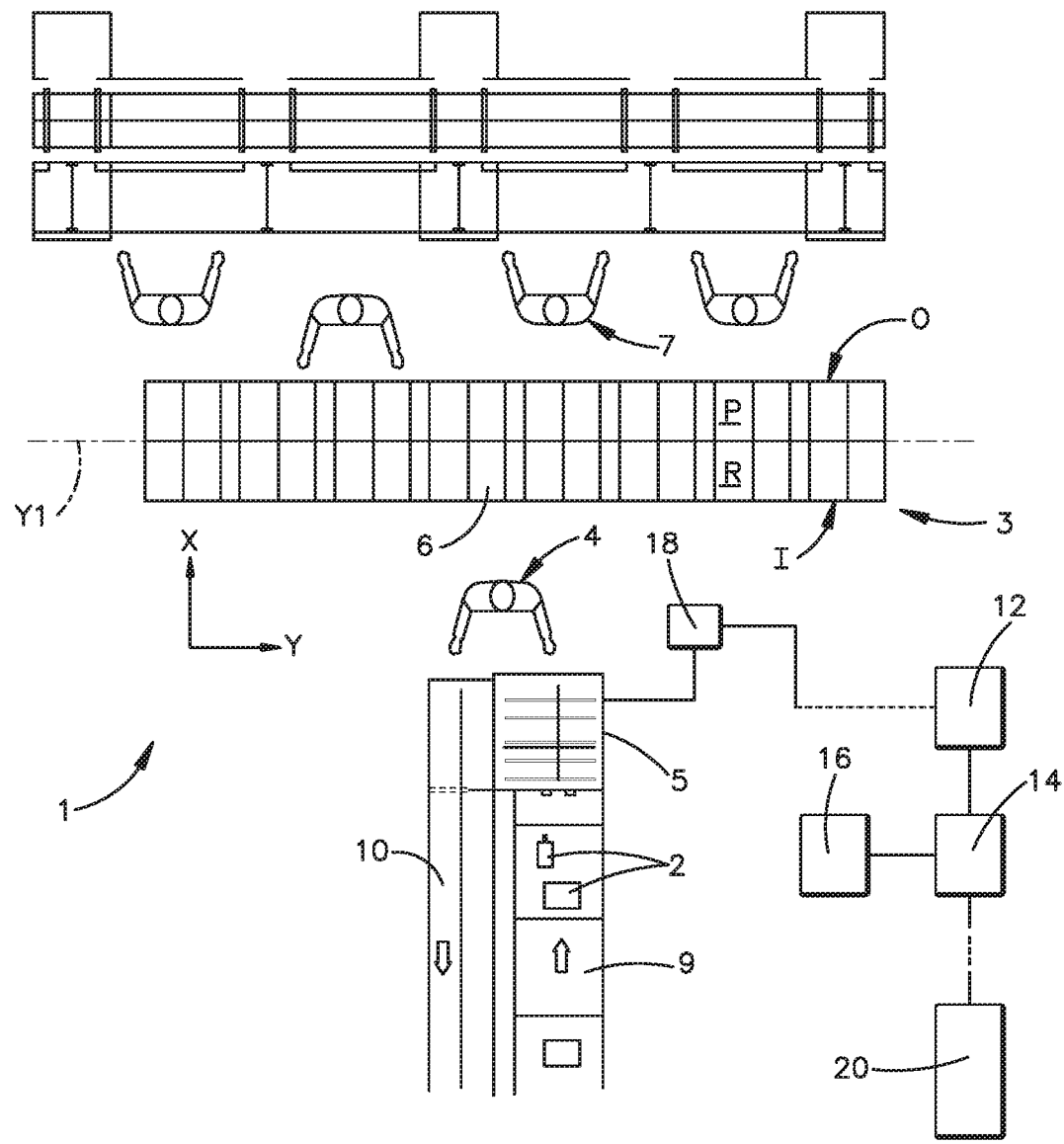
FIG. 1 shows a top plan view of a system for sorting items, according to an embodiment of the present disclosure.

Referring now to FIG. 1, a system 1 for sorting items 2, such as in a fulfillment center, can include a rebin wall 3 for consolidating a plurality of items 2 into groups of items that are each associated with a customer order, which activity is also referred to herein as "rebinning." The rebin wall 3 can extend along a first horizontal direction, such as a transverse direction X, that is perpendicular to a second horizontal direction, such as a lateral direction Y. The rebin wall 3 is preferably elongate along the lateral direction Y. The rebin wall 3 defines a first or induction side I and a second or outlet side O opposite each other along the transverse direction X. The rebin wall 3 can be demarked into a first portion, also referred to herein as a "rebin" portion R, and a second portion, also referred to herein as a "packing" portion P. The rebin portion R can extend from the induction side I along the transverse direction X to a boundary, which can be located along a lateral axis Y1 that intersects a transverse midpoint between the induction side I and the outlet side O. The packing portion P can extend from the outlet side O to the boundary along the transverse direction X. A first operator 4 positioned on the induction side I of the rebin wall 3 can transfer items that have been conveyed to a station 5 located proximate the induction side I to the rebin wall 3 and into the rebin portions R of respective chutes 6 defined therein. Once a group of items is fully consolidated into a chute 6, the first operator 4 can push the items transversely into the packing portion P of the chute 6. It is to be appreciated that one or more additional first operators 4 can transfer items to the rebin portion R of the rebin wall 3.

One or more second operators 7 positioned on the outlet side O of the wall 3 can transfer the consolidated groups of items from the packing portions P of the chutes 6 to one or more additional stations, such as packing stations 8, as described above. The system 1 can include at least one conveyor 9, such as an automated or semi-automated mechanical conveyor, that conveys the plurality items to the station 5. An additional conveyor 10, such as a return conveyor, can convey items away from the station 5 as needed.

The system 1 can include an electronic control unit 12 that is in operative control of the at least one conveyor 9. The control unit 12 can be in communication with a processor 14, such as a microprocessor or the like, that is in communication with computer memory 16 and can be configured to operate software for controlling operation of the system 1, such as by controlling the conveyance of items to the station 5 via the at least one conveyor 9. The processor 14 can also be in communication with the station 5, which can include a user interface 18 allowing the first operator 4 to monitor or affect operation of the system, as needed. The processor 14 can also be in communication with a server 20, which can be located within the fulfillment center or can be located remotely from the fulfillment center, in which case the server 20 can be referred to as a remote server 20. As mentioned above, the rebin wall 2 can be reconfigured so as to adjust the size of one or more and up to all of the chutes 6. The control unit 12 can be configured to transmit instructions for reconfiguring the size of the chutes 6 from the server 20 to the first operator 4, such as by displaying the instructions at the user interface 18, for example. It is envisioned that, multiple times per day, the server 20 can transmit instructions for reconfiguring the rebin wall 3 to the user interface 18. With such transmissions, the server 20 can also provide the control unit 12 with additional instructions for pausing the at least one conveyor 9, such as at a designated time, such as an already scheduled work stoppage, for example, to allow for operators to reconfigure the rebin wall 3 during the work stoppage. Along with the instructions, or in addition to the instructions, a first signal can be transmitted to the control unit 12, such as from the server 20 or from an operator 4 via the user interface 18, that causes the control unit 12 to pause the at least one conveyor 9, and thus pause conveyance of items to the station 5, which allows the rebin wall 3 to be reconfigured, particularly by reconfiguring the dimensions of one or more and up to all of the chutes 6.

Figure 2:
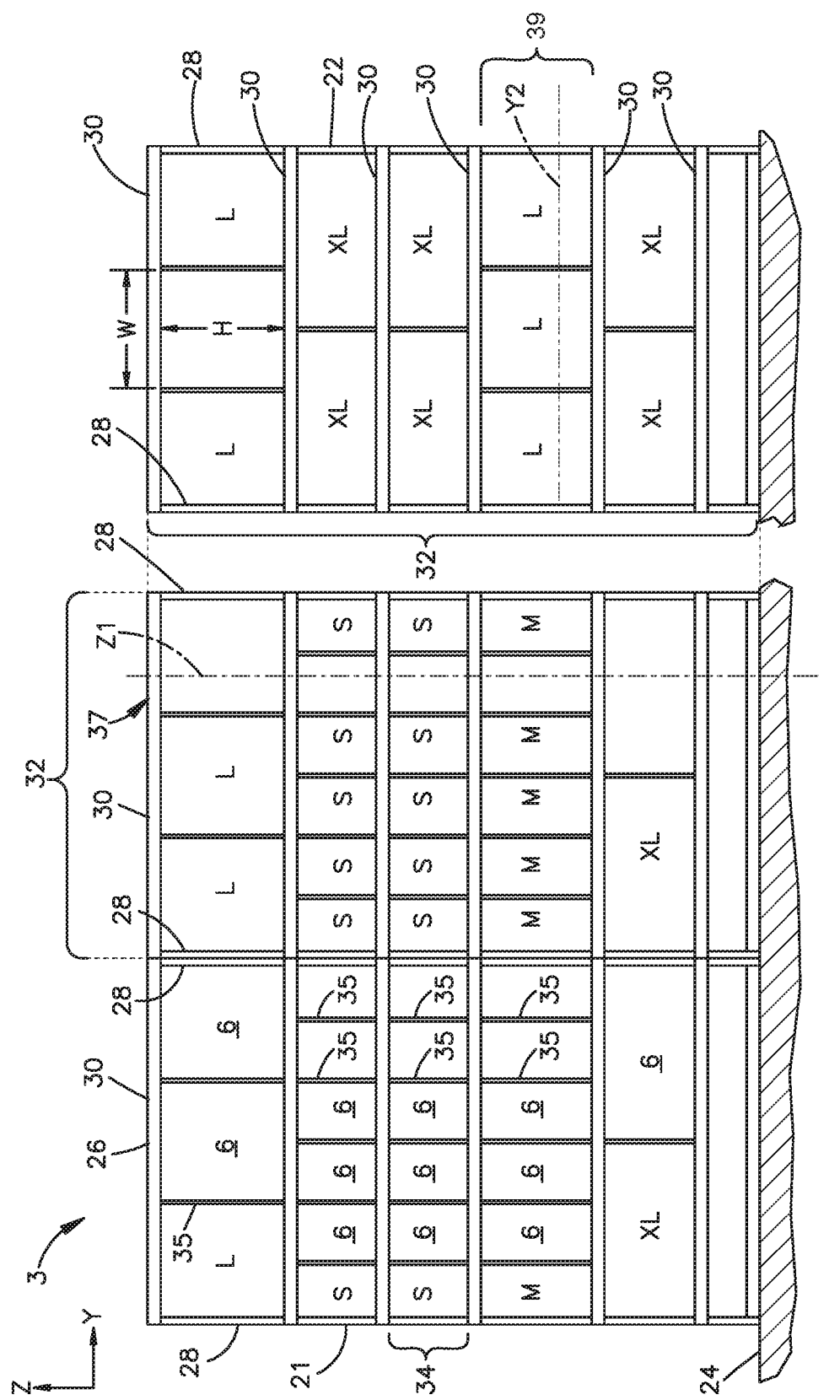
FIG. 2 shows a front elevation view of the rebin wall illustrated in FIG. 1.

Referring now to FIG. 2, the rebin wall 3 can define a first lateral end 21 and a second lateral end 22 spaced from each other along the lateral direction Y. The rebin wall 3 extends from a support surface 24, such as a floor of a fulfillment center, for example, to a top 26 of the wall 3 along a vertical direction Z. It is to be appreciated that the transverse direction X, the lateral direction Y, and the vertical direction Z are perpendicular to each other. As used herein, the term "transversely" means along the transverse direction X; the term "laterally" means along the lateral direction Y; and the term "vertically" means along the vertical direction Z.

The rebin wall 3 can include a plurality of vertical support members 28, which can also be referred to simply as "supports," and a plurality of horizontal support members 30, also referred to herein as "shelves," that are mountable to the vertical support members 28. The rebin wall 3 can define one or more areas or "bays" 32 that extend laterally between adjacent supports 28. Thus, such adjacent supports 28 can define lateral ends of a respective bay 32. Preferably, each vertical support member 28 comprises a panel or the like that extends from the induction side I to the outlet side O, thus enclosing the lateral ends of each bay 32. The one or more bays 32 can also extend vertically between the support surface 24 and the top 26. In the illustrated embodiment, each shelf 30 extends laterally from one support member 28 to the adjacent support member 28, and thus between the lateral ends of a respective bay 32, although other shelf 30 configurations are within the scope of the present disclosure. The top 26 of the rebin wall 3 can also be defined by shelves 30 coupled to top ends of the vertical support members 28 of each bay 32.

It is to be appreciated that in each bay 32, and thus in the rebin wall 3, at least one shelf 30, such as a first shelf 30, can vertically overlay at least one other shelf 30, such as a second shelf 30, so as to define a space 34 therebetween. Such spaces 34 are also referred to herein as "tiers." As shown in FIG. 2, one or more of the bays 32 can include six (6) vertically aligned shelves 30 that collectively define five (5) tiers 34 in the respective bay 32. It is to be appreciated that a bay 32 can carry shelves 30 sufficient to define a single tier 34, two (2) tiers 34, three (3) tiers 34, fourth (4) tiers 34, five (5) tiers 34, six (6) tiers 34, seven (7) tiers 34, eight (8) tiers 34, nine (9) tiers 34, ten (10) tiers 34, or more than ten (10) tiers 34, for example.

The rebin wall 3 also includes a plurality of dividers 35, also referred to herein as "partitions," disposed within the tiers 34 so as to separate at least one chute 6 from at least one other chute 6 within a respective tier 34. Thus, the number of chutes 6 within each tier 34 can be determined by the number of partitions 35 therein. It is to be appreciated that any plurality of vertically aligned chutes 6, such as chutes 6 intersected by a single vertical axis Z1, can be referred to as a "column" 37 of chutes 6. It is also to be appreciated that any plurality of laterally aligned chutes 6, such as chutes 6 intersected by a single lateral axis Y2, can be referred to as a "row" 39 of chutes 6. Thus, each tier 34 that includes at least one partition 35 can be said to comprise a row 39 of chutes 6.

The lateral spacing of one or more partitions 35 within a tier 34 can define a lateral dimension, specifically the width W, of chutes 6 within the tier 34, particularly those that are defined by the one or more partitions 35. The partitions 35 can be laterally spaced from each other according to one or more widths W, which are preferably standardized widths W associated with the rebin wall 3. By way of non-limiting example, some of the chutes 6 shown in FIG. 2 are indicated by standardized chute sizes of small S, medium M, large L, and extra-large XL, each of which can defined by one or more of a standardized width W, a standardized height H, or a standardized area measured along a plane extending along the lateral direction Y and the vertical direction Z, which area can be defined by one or more combinations of standardized heights H and widths W.

In view of the foregoing, it can be said that the rebin wall 3 defines a plurality of chutes 6 arranged in rows 39 and columns 37 of chutes 6, wherein chutes 6 of each of the rows 39 of chutes are spaced from each other along the lateral direction Y, and chutes of each of the columns of chutes are spaced from each other along the vertical direction Z.

Figure 3:
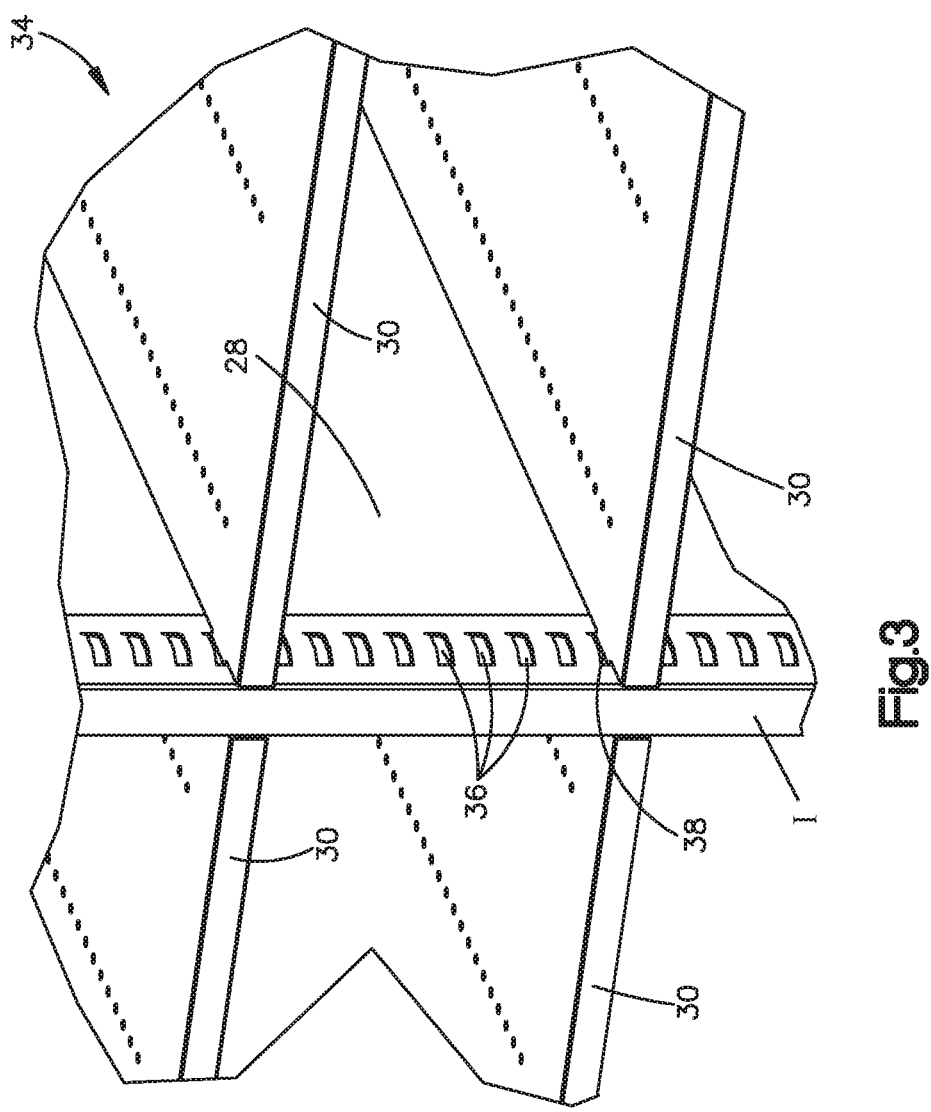
FIG. 3 shows a perspective view of a shelf-mounting structure of a rebin wall, according to an embodiment of the present disclosure.

Referring now to FIG. 3, each support member 28 preferably includes a mounting structure, such as a sequence of vertically aligned mounting slots 36 at each of the induction side I and the outlet side O. Each of the mounting slots 36 can be configured for selectively receiving a complimentary mounting protrusion 38 extending from a lateral side of one or more of the shelves 30. Thus, any shelf 30 having the mounting protrusions 38 can be uncoupled from the respective mounting slots 36 and vertically repositioned along the vertical support members 28. In this manner, the vertical dimension of one or more of the tiers 34 can be adjusted.

Figure 4:
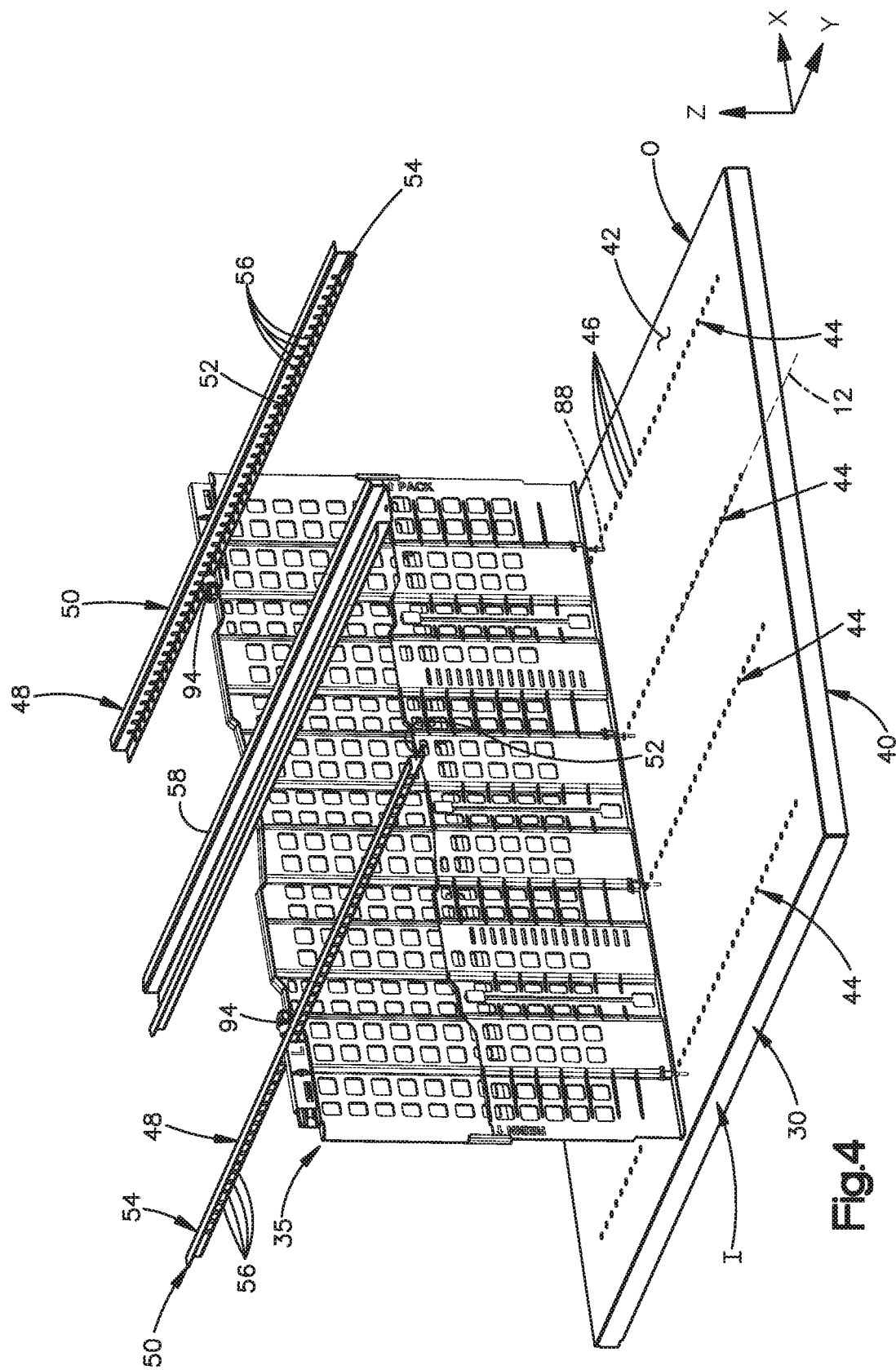
FIG. 4 shows a perspective view of a shelf for the rebin wall illustrated in FIG. 2, also depicting a chute partition coupled to a top surface the shelf and also coupled to a guide assembly, according to an embodiment of the present disclosure.
Figure 5:
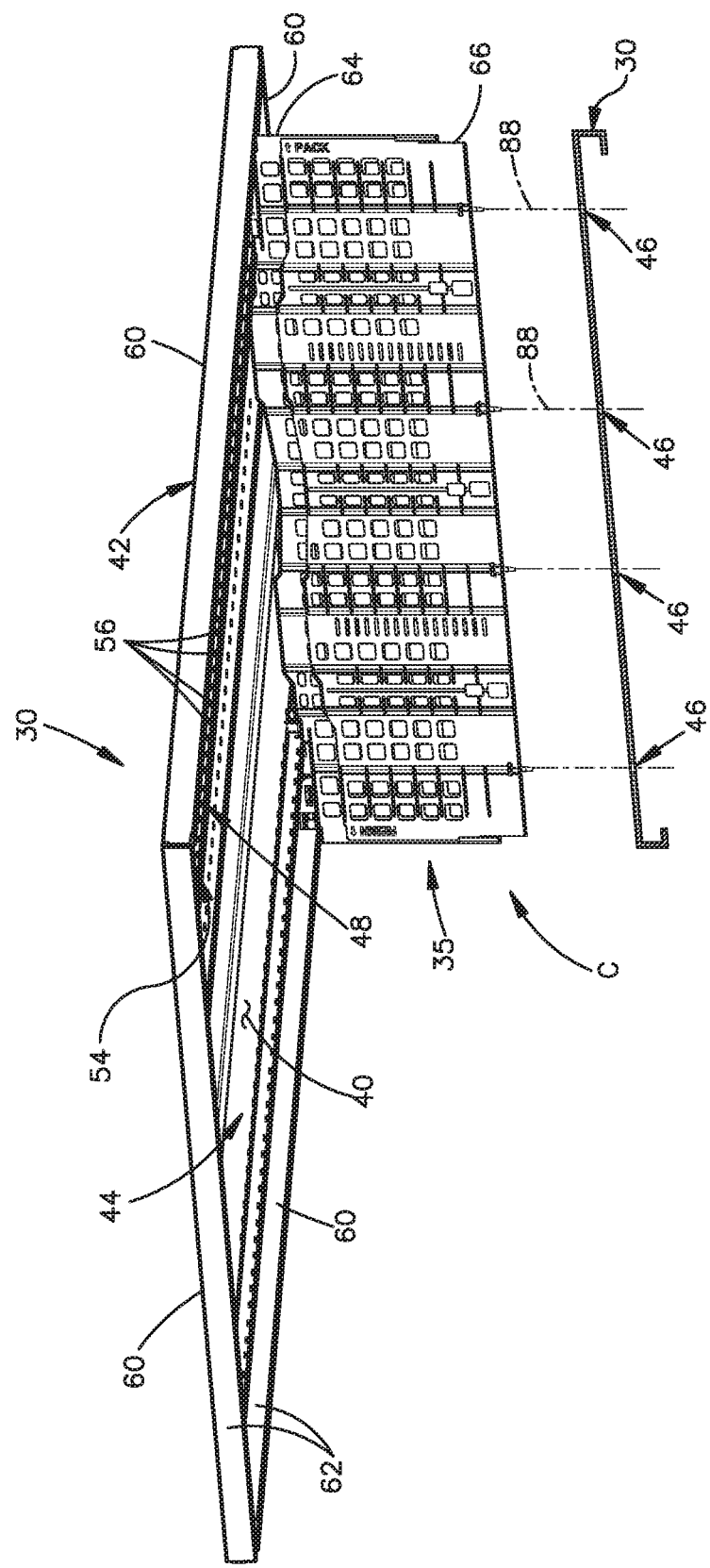
FIG. 5 shows another perspective view of the shelf illustrated in FIG. 4, with a chute partition similar to that of FIG. 4 coupled to a bottom surface of the shelf, according to an embodiment of the present disclosure.

Referring now to FIGS. 4 and 5, one or more and up to all of the shelves 30 of the rebin wall 3 define a bottom surface 40 and an opposed top surface 42 that can each extend from the induction side I to the outlet side O of the rebin wall 3. The top surface 42 is smooth, and is also preferably planer, which facilitate the movement of items along the top surface 42, particularly by the first operator 4 sliding the items from the rebin portion R to the packing portion P. The shelf 30 can define a plurality of anchoring structures 44 extending along the lateral direction Y. For example, each anchoring structure 44 can be a series of anchoring receptacles 46, such as anchoring holes that are defined at least in the top surface 42 and are spaced from each other sequentially along the lateral direction Y such that a single lateral axis Y2 intersects each of the anchoring receptacles 46 of the series 44. The anchoring receptacles 46 can extend vertically through the shelf 30 to the bottom surface 40. As shown, the shelf 30 can define four series 44 of anchoring receptacles 46 each extending laterally along a linear path that is spaced from the linear path of the other series 44 with respect to the transverse direction X. It is to be appreciated that more than four or fewer than four series 44 can be formed in the shelf 30.

The bottom surface 40 of one or more and up to all of the shelves 30 an include a guide or track assembly 48. The track assembly 48 is preferably rigidly affixed to the bottom surface 40, such as by welding, for example, although the track assembly 48 can alternatively be monolithic with the shelf 30. The track assembly 48 includes at least first and second guide members 50 that are elongate along the lateral direction Y. Each guide member 50 can define a guide surface 52 that is elongate along the lateral direction Y. Thus, it can be said that the track assembly 48 includes a first and second guide surfaces 52 each running along (i.e. being elongate along) the lateral direction Y and spaced from each other along the transverse direction X. It is to be appreciated that the guide members 50 can be mounting brackets or the like each defining an L-shaped bracket arm or portion that defines the guide surface 52. Each of the first and second guide members defines a locking structure, such as a series 54 of slots 56 that are sequentially spaced along the lateral direction Y. One or more and preferably each of the partitions 35 is configured to run along, such as by translating along, each of the first and second guide members 50, particularly along the respective guide surfaces 52 thereof. It is to be appreciated that the partitions 35 are coupled to the "overhead" track assembly 48 so that the partitions 35 are vertically suspended therefrom.

It is to be appreciated that the guide members 50 also provide structural support to the shelves 30 to prevent, inhibit, or at least reduce bowing, which might otherwise occur when a large number of relatively heavy objects are located on the top surface 42. The shelf 30 preferably also includes a rigid center support 58 affixed, such as by welding or the like, to the bottom surface 40 so as to be vertically aligned with axis Y1. Peripheral edges 60 of the shelf 30 can include an overhang 62 that prevents people or objects, including items deposited in the tier 34 underlying the shelf 30, from inadvertently contacting, catching against, or otherwise interfering with the track assembly 48.

Figure 6:
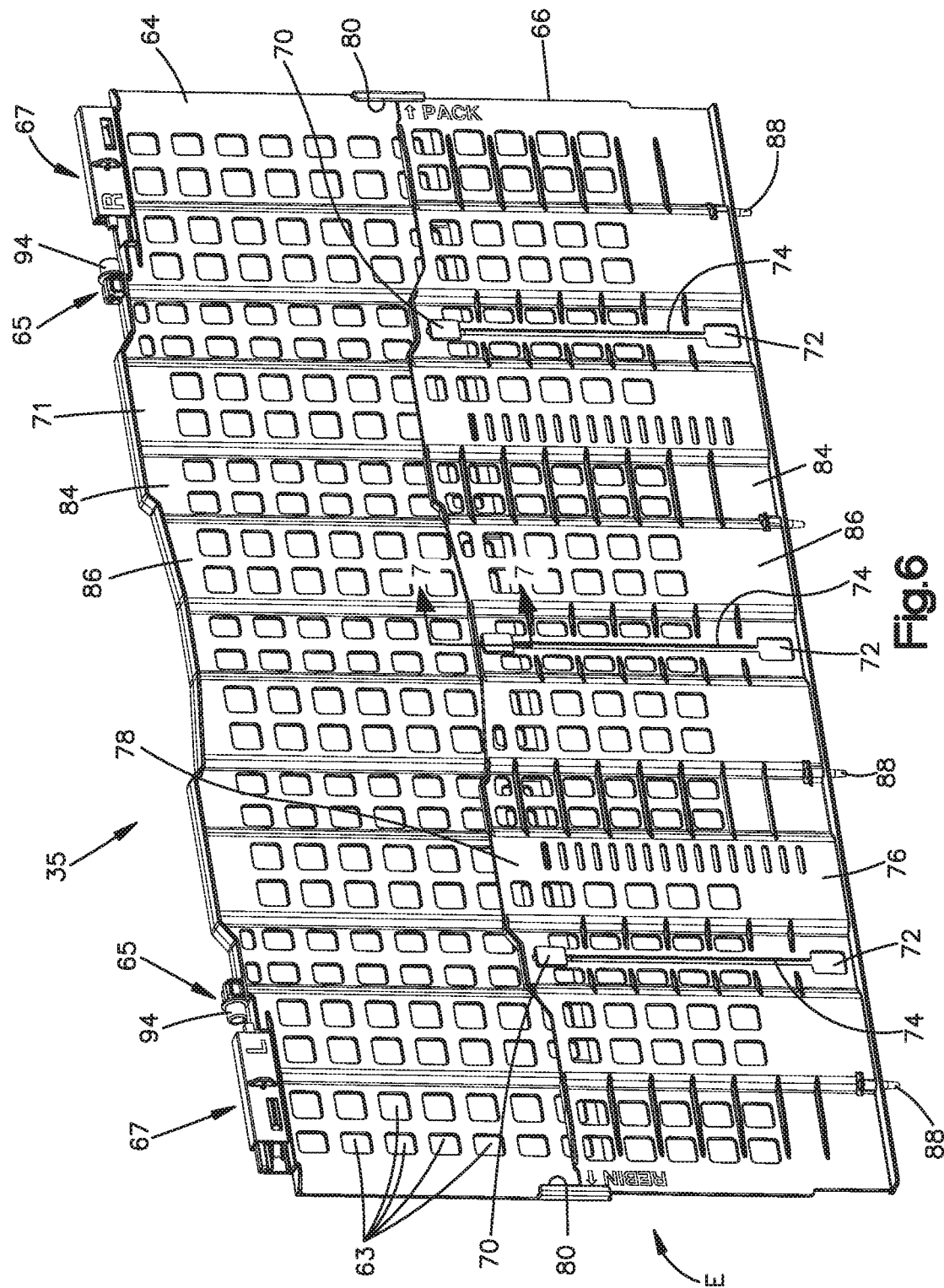
FIG. 6 shows another perspective view of the chute partition illustrated in FIGS. 5 and 6.
Figure 12:
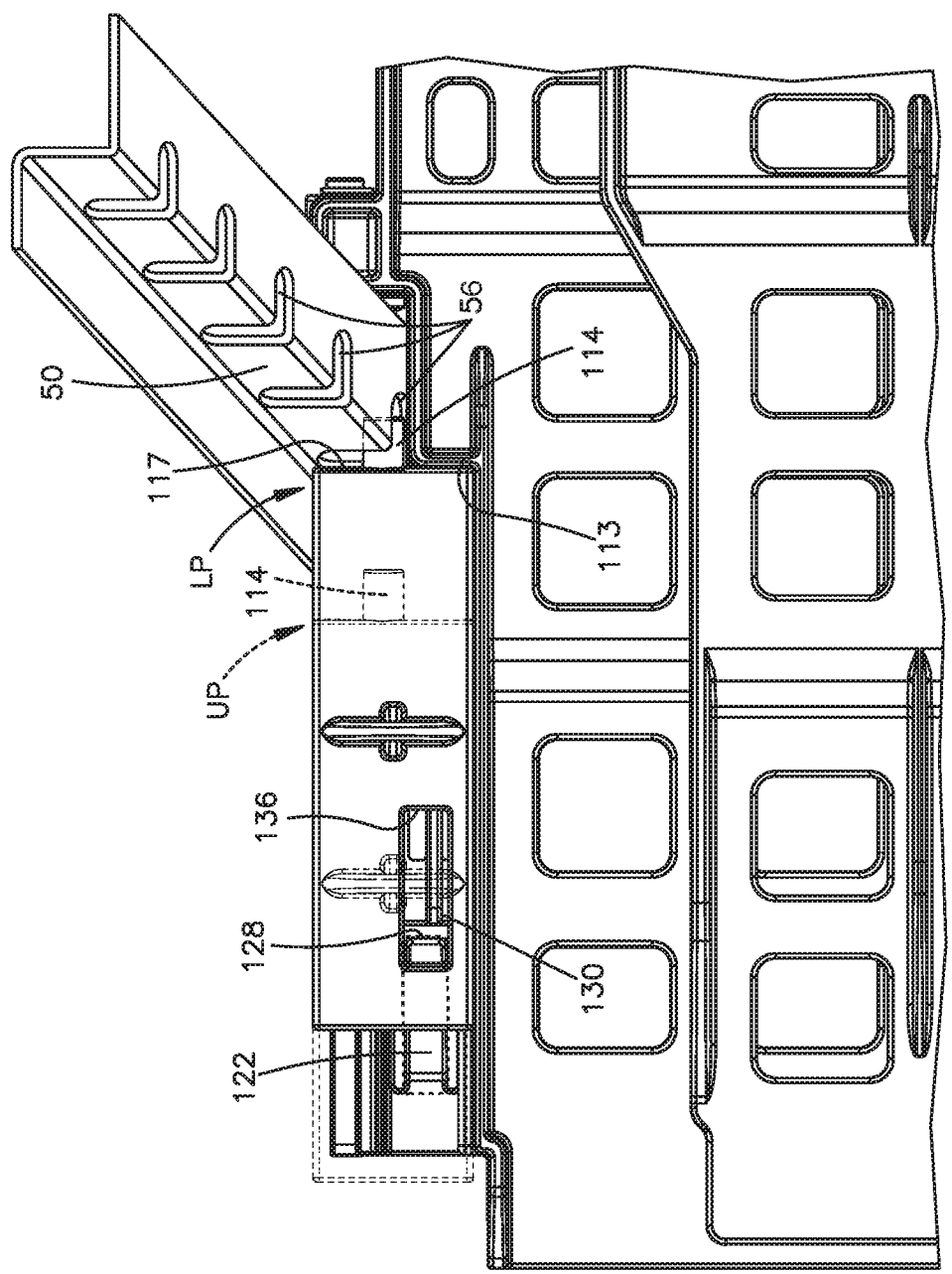
FIG. 12 shows a perspective view of the locking mechanism in engagement with the guide assembly illustrated in FIG. 4, according to an embodiment of the present disclosure.

Referring now to FIGS. 5 and 6, the partitions 35 can include a top portion 64 and a bottom portion 66 that are telescopically coupled to each other so as to be able to vertically translate relative to each other, for instance, between a fully contracted position C, as shown in FIG. 5, and a fully expanded position E, as shown in FIG. 6. The top and bottom portions 64, 66 are sized such that, when coupled to a shelf 30, they each preferably extend from the induction side I to the outlet side O. It is to be appreciated that the top and bottom portions 64, 66 can each be referred to as a "panel." Each of the top and bottom portions 64, 66 preferably defines an array of apertures 63 extending transverse therethrough, providing each portion 64, 66 with a grate-like structure. The apertures 63 are configured to reduce the weight of the partition 35 and to prevent, or at least reduce, warping of the partition 35. The apertures 63 also allow an operator to grip the top and/or bottom portions 64, 66 by interdigitating his or her fingers within the apertures as needed, such as when repositioning the partition 35 to reconfigure the dimensions of one or more adjacent chutes 6. The top portion 64 includes a follower mechanism 65 for running along the guide members 50 and a locking mechanism 67 for selectively locking the top portion 64, and thus the partition 35, in place against the guide members 50. The follower mechanism 65 and the locking mechanism 67 are each located at a top end 71 of the top portion 64, and are each described in more detail below.

The top and bottom portions 64, 66 define complimentary vertical guides that facilitate the telescoping translation. For example, one such group of complimentary vertical guides includes one or more sliders 68, as shown in FIG. 7, each of which can extend from a lower region of the top portion 64. The sliders 68 can each include a retention head 70 that can be inserted laterally through a respective opening 72 of similar size and shape located at a lower region of the bottom portion 66. Once inserted through the respective opening 72, the sliders 68 can translate vertically within respective guide slots 74 defined in the bottom portion 66, while the retention heads 70, which are wider than the guide slots 74, prevent the sliders 68 from backing out of the guide slots 74 laterally. The guide slots 74 extend vertically from a location proximate a bottom end 76 of the bottom portion 66 to a location proximate a top end 78 of the bottom portion 66. It is to be appreciated that the vertical length of the guide slots 74 can determine, such as by limiting, the extent of vertical, telescoping expansion and contraction of the top and top and bottom portions 64, 66. For example, in the illustrated embodiment, at the fully expanded configuration E, the sliders 68 abut respective top ends of the slots 74, and in the fully contracted configuration C, the sliders 68 abut respective bottom ends of the slots 74. To uncoupled the top and bottom portions 64, 66 from each other, the partition 35 can be placed in the fully contracted configuration C, in which the retention heads 70 can escape the guide slots 74 through the openings 72. Another example of complimentary vertical guides includes a pair of fold-over tabs 80 extending from transverse ends 82 of one of the portions 64, 66, such as the top portion 64, and defining respective guide channels in which the other of the portions 66, 64, such as the bottom portion 66, can telescopically translate. A yet another example of complimentary vertical guides in includes complimentary vertical recesses 84 and protrusions 86 defined by the bodies of the top and bottom portions 64, 66.

The bottom portion 66 includes a plurality of downwardly extending anchor pins 88 that are insertable within selective ones of the anchoring receptacles 46 so as to anchor the bottom panel 66 to the underling shelf 30. Preferably, the bottom portion 66 carries a number of pins 88 that corresponds to the number of series 44 of anchoring receptacles 46. In addition to telescopically translating between the fully contracted configuration C and the fully expanded configuration E, the top and bottom portions 64, 66 of each partition 35 can also telescopically translate between an anchored position and an un-anchored position with respect to the underlying shelf 30. In the anchored position, as shown in FIG. 4, the pins 88 reside within the anchor receptacles 46 and the bottom end 76 of the bottom portion 66 preferably abuts the top surface 42 of the underlying shelf 30. In the un-anchored position, the bottom end 76 of the bottom portion 66 is spaced from the top surface 42 of the underlying shelf 30 a sufficient distance such that the anchor pins 88 are remote from the anchor receptacles 46 (i.e., the anchor pins 88 do not extend within the anchor receptacles 46). Once the partition 35 is in the un-anchored position, the partition 35 can be manually repositioned by running along the track assembly 48, as described in more detail below. As shown in FIG. 8, the pins 88 can optionally be coupled to the bottom portion 66 via a C-clip 90 received within an annular recess 92 of the pin 88, allowing the pins 88 to be selectively coupled and uncoupled to the bottom portion 66 as needed.

Referring now to FIGS. 6, 9 and 10, the follower mechanism 65 includes a first roller 94 and a second roller 94 each rotationally coupled to the top portion 64, such as via a respective plain or journal bearing comprising a journal or pin 98 extending through a housing 100. The pin 98 can be coupled to the housing via a C-clip 102 received in an annular recess 104 of the pin 98. The housings 100 position the rollers 94, 94 to roll along the guide surfaces 52 of the guide members 50, thereby translating the partition 35 along the lateral direction Y. The first and second roller 94 preferably extend from their respective housings 100 so as to face away from each other.

Referring now to FIGS. 9 through 12, the locking mechanism 67 includes a first locking member, such as a first locking tab 110, positioned opposite the first roller 94, and a second locking member, such as a second locking tab 110, positioned opposite the second roller 94. The locking tabs 110 are also referred to herein simply as "tabs." Each tab 110 is positioned opposite an abutment surface 113 defined by the top portion 64 of the partition 35. In the illustrated embodiment, each of the first and second tabs 110 is configured to slide along a latch structure 112 between a locked position LP (see FIGS. 9 and 12), in which a locking pin 114 extending from the tab is received within a select one of the slots 56, and an unlocked position UP (see FIG. 12), in which the locking pin 114 is remote from each slot 56 of the series 54 of slots defined in the respective guide member 50. It is to be appreciated that the locking pins 114 are preferably coaxial with one another. Leading ends 117 of the tabs 110 can abut the respective abutment surface 113 in the locked position LP.

The tabs 110 are positioned outwardly toward the respective induction side I or outlet side O relative to the guide member 50, which renders the tabs 110 easier to manually manipulate during a rebin wall 3 configuration process. Each tab 110 can define an outer surface 115 that defines a protrusion 116 for enhanced purchase with a finger. Each tab 110 can also define an inner surface 118 that is opposite the outer surface 115 and rides along the latch structure 112 as the tab 110 moves between the locked and unlocked positions LP, UP. The latch structure 112 includes a detent arm 120 and a latch arm 122 each extending along the transverse direction X. The inner surface 118 defines a first notch 124a and a second notch 124b transversely spaced from each other. The detent arm 120 is configured to deflect into and out of a first and second notch 124a, 124b as the tab 110 rides along the latch structure 112 between the locked and unlocked positions LP, UP such that, in the unlocked position UP, the detent arm 120 resides within the first notch 124, and in the locked position, the detent arm 120 resides within the second notch 124b, by way of non-limiting example. In this manner, first and second notches 124a, 124b can optionally define the limits of the locked and unlocked positions LP, UP.

The tabs 110 can each also define a transversely elongate guide aperture 130 configured to engage the latch arm 122. The latch arm 122 is configured to allow for easy attachment of the tab 110 to the latch structure 112, but to also prevent the tab 110 from decoupling inadvertently from the latch structure 112. To couple the tab 110, an operator can intermesh a first rail-channel guide member 132 defined by the inner surface 118 with a corresponding second rail-channel guide member 134 defined by the latch structure 112, and thereafter advancing the tab 110 until a free end 138 of the latch arm 122 biases within the guide aperture 130. Once the free end 138 biases within the aperture, retracting the tab 110 moves a stop surface 136 defined within a guide aperture 130 toward an opposed free end 138 of the latch arm 122 until they abut one another in a manner inhibiting detachment of the tab 110 from the latch structure 112. An operator can decouple the tab 110 from the latch structure 112 by depressing the latch arm laterally until it deflects out of (i.e., vacates) the guide aperture 130, and subsequently further retracting the tab 110 until the rail-channel guide members 132, 134 disengage. It is to be appreciated that the first rail-channel guide member 132 can define the locking pin 114, as in the illustrated embodiment.

It is to be appreciated that the placement of the locking tabs 110 proximate the transverse ends of the partition 35 effectively requires at least, but not likely more than, two operators to manually reposition a partition 35 along the guide track 48. In particular, the rebin wall 3 and the partitions 35 thereof are designed so that a first operator working from the induction side I can unlock a proximate tab 110 of at least a select one of the partitions 35, which is anchored and locked at a first lateral location along the guide track 48, with ease via pulling on the protrusion 116 of the tab 110, such as with his or her thumb, while a second operator working from the outlet side O can unlock the proximate tab 110 of the select partition 35 with ease via pulling on the protrusion 116, such as with his or her thumb. The operators can also lift the bottom portion 66 upward, thereby causing it to telescopically translate relative to the top portion 64 a sufficient distance to vacate the anchor pins 88 from the anchor receptacles 64. It is to be appreciated that the locking tabs 110 can be unlocked before, concurrently with, or subsequent to disengaging the anchor pins 88 from the anchor receptacles 64. However, it is also to be appreciated that the grate-like structure of the partitions 35 can allow the operators to interdigitate as necessary to lift the bottom portion 66 with one hand and toggle the locking tab 110 between the locked and unlocked positions LP, UP with the thumb of the same hand. Once the tabs 110 and pins 88 are respectively unlocked and un-anchored, the operators can move the partition 35 along the guide track 48, via the roller-to-guide surface 94-52 engagement, to a selected second lateral location along the guide track 48, and to lock the tabs 110 and anchor the pins 88 so as to affix the partition 35 to the shelves 30 at the second select location. It is to be appreciated that the partitions 35 and the track assembly 48 are cooperatively configured such that, once the pins 88 of a partition 35 are unanchored from the receptacles 46, the operators can rotate the partition 35 upwards at least about 45 degrees toward the upper shelf 30 while the partition 35 remains oriented along the third direction X (and thus perpendicular to the lateral direction Y), which upward rotation can assist the operators in translating the partition 35 along the guide members 50. Moreover, the cooperative design of the track assembly 48 and the partitions 35, including the attachable and detachable pins 98 and clips 102 of the rollers 94, allows the operators to couple additional partitions 35 to a tier 34 or detach partitions 35 from a tier 34 as needed to achieve a desired wall 3 configuration. The foregoing features of the rebin wall 3 allow the operators to quickly and efficiently reconfigure the dimensions of one or more and up to all of the chutes 6 in the rebin wall 3. Such reconfiguration, as mentioned above, can be accomplished with minimal work stoppage, particularly when the reconfiguring is performed during regular work stoppages, such as a lunch break, for example.

The inventors envision that the rebin wall 3 can be reconfigured multiple times a day. For example, referring again to FIG. 1, the control unit 12 can be configured to send instructions for reconfiguring the dimensions of the chutes 6 multiple times per day to the station 5 based on the items that the control unit 12 anticipates conveying to the station 5. Similarly, the control unit 12 can be configured to route items to particular rebin walls 3 within a fulfillment center based on the present or anticipated configuration of the respective rebin wall 3. In this manner, the reconfigurable rebin walls 3 described herein provide a fulfillment center with greater flexibility for sorting items, in addition to the enhanced efficiency and work volume mentioned above.

Additional non-limiting embodiments of the present disclosure are set forth below:

Embodiment 1

A method of reconfiguring a wall 3 of an item sorting system 1 in an order fulfillment center—the wall 3 defining a plurality of chutes 6 arranged in rows 39 and columns 37 of chutes, wherein chutes 6 of each of the rows 39 of chutes are spaced from each other along a lateral direction Y, and chutes 6 of each of the columns 37 of chutes are spaced from each other along a vertical direction Z perpendicular to the lateral direction Y—the method comprising; conveying a plurality of items 2 along at least one conveyor 9 to a station 5 proximate an induction side I of the wall 3, wherein the induction side I of the wall 3 is opposite an outlet side O of the wall 3 along a third direction X perpendicular to each of the lateral direction Y and the vertical direction Z; moving at least some of the plurality of items 2 from the station 5 to the induction side I; depositing the at least some of the items 2 through openings into respective chutes 6 of the plurality of chutes 6, thereby consolidating groups of the plurality of items 2 into the respective chutes 6, wherein each of the groups is associated with a customer order; transmitting a first signal to a control unit 12 that is in operative control of the at least one conveyor 5, thereby causing the control unit 12 to pause the at least one conveyor 5 responsive to the first signal. The method includes, while the at least one conveyor 5 is paused: telescopically contracting each of a first partition 35 and a second partition 35 of a select row 39 of chutes upward along the vertical direction Z, thereby uncoupling anchor pins 88 affixed to a bottom end 76 of each of the first and second partitions 35 from engagement with complimentary first anchor receptacles 46 defined in a first shelf 30 that defines a bottom of the select row 39 of chutes; after the telescopically contracting step, translating the first and second partitions 35 along a track assembly 48 elongate along the lateral direction Y, the track assembly affixed to an underside 40 of a second shelf 30 that defines a top of the select row 39 of chutes, each of the first and second partitions 35 separating a respective pair of chutes 6 of the select row 39 of chutes, wherein the translating step adjusts a dimension of each chute 6 of the respective pair of chutes along the lateral direction Y; and telescopically expanding the first and second partitions 35 downward along the vertical direction Z, thereby coupling the anchor pins 80 to complimentary second anchor receptacles 46 defined in the first shelf 30 in a manner anchoring the first and second receptacles 35 to the first shelf 30. The method includes transmitting a second signal to the control unit 12, thereby causing the control unit 12 to resume conveyance of the at least one conveyor 5 responsive to the second signal.

Embodiment 2

The method of Embodiment 1, further comprising, while the at least one conveyor 5 is paused, adjusting a dimension of each chute 6 of the select row 39 of chutes along the vertical direction Z, wherein the adjusting step comprises moving at least one of the first and second shelves 30 with respect to the other of the first and second shelves 30 along the vertical direction Z.

Embodiment 3

The method of Embodiment 1 or Embodiment 2, wherein the translating step comprises manually moving the first and second partitions 35 along the track assembly 48, wherein the manually moving step comprises: causing a first pair of rollers 94 rotationally coupled to a top end 71 of the first partition 35 to roll along a first guide surface 52 defined by a first guide member 50 of the track assembly 48, and causing a second pair of rollers 94 rotationally coupled to a top end 71 of the second partition 35 to roll along a second guide surface 52 defined by a second guide member 50 of the track assembly 48, wherein the guide surfaces 52 are spaced from each other along the third direction X, a center support member 58 of the track assembly 48 extends parallel with the guide surfaces 52 along the lateral direction Y, and the center support member 58 is disposed equidistantly between the guide surfaces 52 with respect to the third direction X.

Embodiment 4

The method of Embodiment 3, further comprising, prior to the manually moving step: moving each of a first tab 110 and a second tab 110 coupled to the top end 71 of the first partition 35 from respective first and second locked positions LP to respective first and second unlocked positions UP, wherein 1) in the first locked position LP, a first locking pin 114 of the first tab 110 extends within one of a first series 54 of complimentary slots 56 spaced sequentially along the first guide member 50, and 2) in the second locked position LP, a second locking pin 114 of the second tab 110 extends within one of a second series 54 of complimentary slots 56 spaced sequentially along the second guide member 50; and moving each of a third tab 110 and a fourth tab 110 coupled to the top end 71 of the second partition 35 from respective third and fourth locked positions LP to respective third and fourth unlocked positions UP, wherein 1) in the third locked position LP, a third locking pin 114 of the third tab 110 extends within another of the first series 54 of complimentary slots 56, and 2) in the fourth locked position LP, a fourth locking pin 114 of the fourth tab 110 extends within another of the second series 54 of complimentary slots 56.

Embodiment 5

The method of Embodiment 4: wherein moving each of the first tab 110 and the second tab 110 comprises 1) sliding the first and second tabs 110 away from each other along the third direction X, and 2) sliding each of the third tab 110 and the fourth tab 110 comprises sliding the third and fourth tabs 110 away from each other along the third direction X.

Embodiment 6

The method of Embodiment 5: wherein the sliding steps each comprise manually gripping an outer surface 115 of each respective tab 110 and pulling each respective tab 110 along a respective latch structure 112 that is disposed at the top end 71 of the respective partition 35, thereby riding an inner surface 118 of the respective tab 110 against a detent arm 120 of the latch structure 112 in a manner causing the detent arm 120 to deflect out of a first notch 124a defined in the inner surface 118 and subsequently deflect into a second notch 124b that is defined in the inner surface 118 and is spaced from the first notch 124a along the third direction X, the first notch 124a defines the locked position LP, and the second notch 124b defines the unlocked position UP.

Embodiment 7

The method of Embodiment 6, wherein the sliding steps each comprise sliding at least one guide rail defined by the one of the inner surface 118 and the latch structure 112 along and within a complementary at least one guide slot defined by the other of the inner surface 118 and the latch structure 112.

Embodiment 8

The method of Embodiment 6 or Embodiment 7, wherein the pulling step comprises moving a stop surface 136 defined within a guide aperture 130 of the respective tab 110 toward an opposed free end 138 of a latch arm 122 that is biased within the guide aperture 130 until the stop surface 136 abuts the free end 138 in a manner inhibiting detachment of the respective tab 110 from the latch structure 112.

Embodiment 9

The method of Embodiment 8, further comprising depressing the latch arm 122 along the lateral direction Y until the latch arm 122 vacates the guide aperture 130, and subsequently detaching the respective tab 110 from the latch structure 112.

Embodiment 10

The method of any one of Embodiment 1 through Embodiment 9, wherein: each of the first and second partitions 35 comprises an upper partition panel 64 slidably coupled to a lower partition panel 66 in a parallel manner, the upper partition panel 64 and the lower partition panel 66 each extending from the induction side I to the outlet side O, the upper partition panel 64 translationally coupled to the track assembly 48, the telescopically contracting step comprises, for each of the first and second partitions 35, translating the lower partition panel 66 upward relative to the upper partition panel 64, and the telescopically expanding step comprises, for each of the first and second partitions 35, translating the lower partition panel 66 downward relative to the upper partition panel 64.

Embodiment 11

A wall 3 for rebinning items 2 in an order fulfillment center, comprising: a first shelf 30 vertically overlaying a second shelf 30 so as to define a space 34 therebetween, the first and second shelves 30 each defining a bottom surface 40 and an opposed top surface 42 that is planar, smooth, and extends from an induction side I to an outlet side O; a track assembly 48 affixed to the bottom surface 40 of the first shelf 30, the track assembly 48 defining first and second guide members 50 running along a direction Y that is parallel with the induction and outlet sides I, O, each of the first and second guide members 50 defining a series 54 of slots 56 that are sequentially spaced along the direction Y; at least one partition 35 having a top portion 64 and a bottom portion 66 telescopically coupled to each other so as to vertically translate relative to each other between a first position, in which pins 88 of the bottom portion 66 anchor within receptacles 46 of the second shelf 30, and a second position, in which the pins 88 are remote from the receptacles 46; a first roller 94 and a second roller 94 each rotationally coupled to the top portion 64, wherein the first and second rollers 94 are configured to roll along the first and second guide members 50, respectively, so as to translate the at least one partition 35 along the direction Y; and a first locking member opposite the first roller 94 and a second locking member opposite the second roller 94, wherein each of the first and second locking members comprises a tab 110 configured to slide along a latch structure 112 between 1) a locked position LP in which a locking pin 114 extending from the tab 110 is received within a select one of the slots 56, and 2) an unlocked position UP in which the locking pin 114 is remote from each of the series 54 of slots 56.

Embodiment 12

The wall 3 of Embodiment 11, further comprising a plurality of supports 28 extending vertically between a floor 24 and a top 26 of the wall 3, wherein the first and second shelves 30 are each vertically repositionable along the supports 28 so as to change a vertical dimension of the chutes 6 of the space 34 defined between the first and second shelves 30.

Embodiment 13

The wall 3 of Embodiment 11 or Embodiment 12, wherein the top and bottom portions 64, 66 define complimentary features that restrict relative movement between the top and bottom portions 64, 66 to facilitate telescopic translational movement.

Embodiment 14

The wall 3 of Embodiment 13, wherein the complimentary features include a vertically elongate slot 74 defined in the bottom portion 66, wherein a slider 68 defined by the top portion 64 extends within the vertically elongate slot 74 and is configured to vertically translate along the vertically elongate slot 74.

Embodiment 15

The wall 3 of Embodiment 14, wherein the slider 68 defines a head 70 that is wider than the vertically elongate slot 74 so as to retain the slider 68 within the vertically elongate slot 74.

Embodiment 16

The wall 3 of Embodiment 15, wherein the vertically elongate slot 74 is in communication with an opening 72 that is wider than the head 70, such that the slider 68 can escape the vertically elongate slot 74 when the head 70 is aligned with the opening 72.

Embodiment 17

The wall 3 of any one of Embodiment 11 through Embodiment 16, further comprising a center support beam 58 welded to the bottom surface 40 of the first shelf 30 and spaced equidistantly between the first and second guide members 50.

Embodiment 18

The wall 3 of any one of Embodiment 11 through Embodiment 17, wherein the latch structure 112 comprises a detent arm 122 configured to deflect within a notch 124a defined in an inner surface 118 of the tab 110 when the tab 110 is in the locked position LP.

Embodiment 19

The wall 3 of any one of Embodiment 11 through Embodiment 18, wherein the pins 88 comprise at least four pins 88 anchored within at least four respective receptacles 46 when the top and bottom portions 64, 66 of the at least one partition 35 are in the first position.

Embodiment 20

The wall 3 of any one of Embodiment 11 through Embodiment 19, wherein the locking pins 114 are coaxial with each other.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above in connection with the respective above-described embodiments may be employed alone or in combination with any of the other embodiments described above. It should further be appreciated that the various alternative embodiments described above with respect to one illustrated embodiment can apply to all embodiments as described herein, unless otherwise indicated. Also, the present invention is not intended to be limited by any description of drawbacks or problems with any prior art device.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A method of reconfiguring a wall of an item sorting system in an order fulfillment center, the wall defining a plurality of chutes arranged in rows and columns of chutes, wherein chutes of each of the rows of chutes are spaced from each other along a lateral direction, and chutes of each of the columns of chutes are spaced from each other along a vertical direction perpendicular to the lateral direction, the method comprising:
  conveying a plurality of items along at least one conveyor to a station proximate an induction side of the wall, wherein the induction side of the wall is opposite an outlet side of the wall along a third direction perpendicular to each of the lateral direction and the vertical direction;
  moving at least some of the plurality of items from the station to the induction side;
  depositing the at least some of the items through openings into respective chutes of the plurality of chutes, thereby consolidating groups of the plurality of items into the respective chutes, wherein each of the groups is associated with a customer order;
  transmitting a first signal to a control unit that is in operative control of the at least one conveyor, thereby causing the control unit to pause the at least one conveyor responsive to the first signal;
  while the at least one conveyor is paused,
    telescopically contracting each of a first partition and a second partition of a select row of chutes upward along the vertical direction, thereby uncoupling anchor pins affixed to a bottom end of each of the first and second partitions from engagement with complimentary first anchor receptacles defined in a first shelf that defines a bottom of the select row of chutes; and
    after the telescopically contracting step, translating the first and second partitions along a track assembly elongate along the lateral direction, the track assembly affixed to an underside of a second shelf that defines a top of the select row of chutes, each of the first and second partitions separating a respective pair of chutes of the select row of chutes, wherein the translating step adjusts a dimension of each chute of the respective pair of chutes along the lateral direction; and
    telescopically expanding the first and second partitions downward along the vertical direction, thereby coupling the anchor pins to complimentary second anchor receptacles defined in the first shelf in a manner anchoring the first and second partitions to the first shelf; and
  transmitting a second signal to the control unit, thereby causing the control unit to resume conveyance of the at least one conveyor responsive to the second signal.

2. The method of claim 1, further comprising, while the at least one conveyor is paused, adjusting a dimension of each chute of the select row of chutes along the vertical direction, wherein the adjusting step comprises moving at least one of the first and second shelves with respect to the other of the first and second shelves along the vertical direction.

3. The method of claim 1, wherein the translating step comprises manually moving the first and second partitions along the track assembly, wherein the manually moving step comprises:
   causing a first pair of rollers rotationally coupled to a top end of the first partition to roll along a first guide surface defined by a first guide member of the track assembly, and
   causing a second pair of rollers rotationally coupled to a top end of the second partition to roll along a second guide surface defined by a second guide member of the track assembly,
   wherein the guide surfaces are spaced from each other along the third direction, a center support member of the track assembly extends parallel with the guide surfaces along the lateral direction, and the center support member is disposed equidistantly between the guide surfaces with respect to the third direction.

4. The method of claim 3, further comprising, prior to the manually moving step:
   moving each of a first tab and a second tab coupled to the top end of the first partition from respective first and second locked positions to respective first and second unlocked positions, wherein 1) in the first locked position, a first locking pin of the first tab extends within one of a first series of complimentary slots spaced sequentially along the first guide member, and 2) in the second locked position, a second locking pin of the second tab extends within one of a second series of complimentary slots spaced sequentially along the second guide member; and
   moving each of a third tab and a fourth tab coupled to the top end of the second partition from respective third and fourth locked positions to respective third and fourth unlocked positions, wherein 1) in the third locked position, a third locking pin of the third tab extends within another of the first series of complimentary slots, and 2) in the fourth locked position, a fourth locking pin of the fourth tab extends within another of the second series of complimentary slots.

5. The method of claim 4, wherein moving each of the first tab and the second tab comprises sliding the first and second tabs away from each other along the third direction, and moving each of the third tab and the fourth tab comprises sliding the third and fourth tabs away from each other along the third direction.

6. The method of claim 5, wherein the sliding steps each comprise manually gripping an outer surface of each respective tab and pulling each respective tab along a respective latch structure that is disposed at the top end of the respective partition, thereby riding an inner surface of the respective tab against a detent arm of the latch structure in a manner causing the detent arm to deflect out of a first notch defined in the inner surface and subsequently deflect into a second notch that is defined in the inner surface and is spaced from the first notch along the third direction, the first notch defines the respective locked position, and the second notch defines the respective unlocked position.

7. The method of claim 6, wherein the sliding steps each comprise sliding at least one guide rail defined by the one of the inner surface and the latch structure along and within a complementary at least one guide slot defined by the other of the inner surface and the latch structure.

8. The method of claim 6, wherein the pulling step comprises moving a stop surface defined within a guide aperture of the respective tab toward an opposed free end of a latch arm that is biased within the guide aperture until the stop surface abuts the free end in a manner inhibiting detachment of the respective tab from the latch structure.

9. The method of claim 8, further comprising depressing the latch arm along the lateral direction until the latch arm vacates the guide aperture, and subsequently detaching the respective tab from the latch structure.

10. The method of claim 1, wherein:
    each of the first and second partitions comprises an upper partition panel slidably coupled to a lower partition panel in a parallel manner, the upper partition panel and the lower partition panel each extending from the induction side to the outlet side, the upper partition panel translationally coupled to the track assembly,
    the telescopically contracting step comprises, for each of the first and second partitions, translating the lower partition panel upward relative to the upper partition panel, and
    the telescopically expanding step comprises, for each of the first and second partitions, translating the lower partition panel downward relative to the upper partition panel.

11. A wall for rebinning items in an order fulfillment center, comprising:
    a first shelf vertically overlaying a second shelf so as to define a space therebetween, the first and second shelves each defining a bottom surface and an opposed top surface that is planar, smooth, and extends from an induction side to an outlet side;
    a track assembly affixed to the bottom surface of the first shelf, the track assembly defining first and second guide members running along a direction that is parallel with the induction and outlet sides, each of the first and second guide members defining a series of slots that are sequentially spaced along the direction;
    at least one partition having a top portion and a bottom portion telescopically coupled to each other so as to vertically translate relative to each other between a first position, in which pins of the bottom portion anchor within receptacles of the second shelf, and a second position, in which the pins are remote from the receptacles;
    a first roller and a second roller each rotationally coupled to the top portion, wherein the first and second rollers are configured to roll along the first and second guide members, respectively, so as to translate the at least one partition along the direction; and
    a first locking member opposite the first roller and a second locking member opposite the second roller, wherein each of the first and second locking members comprises a tab configured to slide along a latch structure between 1) a locked position in which a locking pin extending from the tab is received within a select one of the slots, and 2) an unlocked position in which the locking pin is remote from each of the series of slots.

12. The wall of claim 11, further comprising a plurality of supports extending vertically between a floor and a top of the wall, wherein the first and second shelves are each vertically repositionable along the supports so as to change a vertical dimension of the space defined between the first and second shelves.

13. The wall of claim 11, wherein the top and bottom portions define complimentary features that restrict relative movement between the top and bottom portions to facilitate telescopic translational movement.

14. The wall of claim 13, wherein the complimentary features include a vertically elongate slot defined in the bottom portion, wherein a slider defined by the top portion extends within the vertically elongate slot and is configured to vertically translate along the vertically elongate slot.

15. The wall of claim 14, wherein the slider defines a head that is wider than the vertically elongate slot so as to retain the slider within the vertically elongate slot.

16. The wall of claim 15, wherein the vertically elongate slot is in communication with an opening that is wider than the head, such that the slider can escape the vertically elongate slot when the head is aligned with the opening.

17. The wall of claim 11, further comprising a center support beam welded to the bottom surface of the first shelf and spaced equidistantly between the first and second guide members.

18. The wall of claim 11, wherein the latch structure comprises a detent arm configured to deflect within a notch defined in an inner surface of the tab when the tab is in the locked position.

19. The wall of claim 11, wherein the pins comprise at least four pins anchored within at least four respective receptacles when the top and bottom portions of the at least one partition are in the first position.

20. The wall of claim 11, wherein the locking pins of the first and second locking members are coaxial with each other.

* * * * *